US012621910B2

(12) United States Patent
Ashdown

(10) Patent No.: US 12,621,910 B2
(45) Date of Patent: May 5, 2026

(54) LUMINAIRE WITH MULTICOLOR NEURAL NETWORK CONTROL

(71) Applicant: SUNTRACKER TECHNOLOGIES LTD., Victoria (CA)

(72) Inventor: Ian Edward Ashdown, West Vancouver (CA)

( * ) Notice: Subject to any disclaimer, the term of this patent is extended or adjusted under 35 U.S.C. 154(b) by 215 days.

(21) Appl. No.: 18/681,710

(22) PCT Filed: Jun. 23, 2023

(86) PCT No.: PCT/CA2023/050879

§ 371 (c)(1),
(2) Date: Feb. 6, 2024

(87) PCT Pub. No.: WO2023/245302

PCT Pub. Date: Dec. 28, 2023

(65) Prior Publication Data

US 2026/0025887 A1      Jan. 22, 2026

Related U.S. Application Data

(60) Provisional application No. 63/355,321, filed on Jun. 24, 2022.

(51) Int. Cl.
*H05B 45/20* (2020.01)
*G06N 3/08* (2023.01)
*H05B 45/10* (2020.01)

(52) U.S. Cl.
CPC .............. *H05B 45/20* (2020.01); *G06N 3/08* (2013.01); *H05B 45/10* (2020.01)

(58) Field of Classification Search
CPC .......... H05B 45/20; H05B 45/10; G06N 3/08
See application file for complete search history.

(56) References Cited

U.S. PATENT DOCUMENTS 7,687,753 B2     3/2010   Ashdown
2002/0171373 A1*   11/2002   Muthu ................... H05B 45/20
                                                    315/219

(Continued)

FOREIGN PATENT DOCUMENTS

CN        105611678        5/2016
CN        206149537        5/2017

(Continued)

OTHER PUBLICATIONS

Fernandez-Rendondo, M., et al. 2004. "Training Radial Basis Functions by Gradient Descent," Proc. International Conference on Artificial Intelligence and Soft Computing (ICAISC 2004), pp. 184-189.

(Continued)

*Primary Examiner* — Raymond R Chai
(74) *Attorney, Agent, or Firm* — Damien G Loveland; Valuetech Patent Agency Inc.

(57)                ABSTRACT
The chromaticity and luminous flux output of a multicolor luminaire with multiple independent wavelength outputs is controlled by a controller that has fewer input channels than there are output channels. A trained neural network is used such that the multi-color wavelength settings of the luminaire produce the specified chromaticity and luminous flux output while optimizing luminous efficacy or color rendering capabilities, or satisfying other constraints applied to the luminaire.

13 Claims, 10 Drawing Sheets

(56)                References Cited

U.S. PATENT DOCUMENTS

| | | | |
|---|---|---|---|
| 2003/0076056 A1 | 4/2003 | Schuurmans | |
| 2005/0062446 A1* | 3/2005 | Ashdown | H05B 45/20 |
| | | | 315/324 |
| 2009/0153075 A1* | 6/2009 | Li | H05B 45/37 |
| | | | 315/294 |
| 2010/0174345 A1 | 7/2010 | Ashdown | |
| 2010/0259182 A1 | 10/2010 | Man et al. | |
| 2013/0076250 A1 | 3/2013 | Logiudice | |

FOREIGN PATENT DOCUMENTS

| | | |
|---|---|---|
| CN | 209201375 | 8/2019 |
| CN | 112651303 | 4/2021 |
| CN | 113326935 | 8/2021 |
| WO | 2018200685 | 11/2018 |

OTHER PUBLICATIONS

Ashdown, I. 2004. "Neural Networks for LED Color Control," Third International Conference on Solid State Lighting, Proc. SPIE 5187, pp. 215-226.

Ashdown, Ian, Controlling Multicolor LED Luminaires, Feb. 2019, Blog, Entertainment, Lighting Controls, Theatrical Luminaires , All Things Lighting Association.

Hernandez Espinosa et al., Ensembles of RBFs Trained by Gradient Descent. 223-228. 10.1007/978-3-540-28647-9_38.

Jiajie Fan et al., Machine-Learning Assisted Prediction of Spectral Power Distribution for Full-Spectrum White Light-Emitting Diode, IEEE Photonics Journal, vol. 12, No. 1, Feb. 2020, IEEE Photonics Society Publication.

Inyup Paik et al., Plant photoreceptors: Multi-functional sensory proteins and their signaling networks, Seminars in Cell & Developmental Biology vol. 92, Aug. 2019, pp. 114-121.

Gholam Ali Montazer et al, Radial Basis Function Neural Networks: A Review, Computer Reviews Journal vol. 1 No. 1 (2018) ISSN: 2581-6640, http://purkh.com/index.php/tocomp.

Sourabh Katoch et al., A review on genetic algorithm: past, present, and future, Springer Science+Business Media, LLC, part of Springer Nature 2020, Oct. 31, 2020, Multimedia Tools and Applications (2021) 80:8091-8126, https://doi.org/10.1007/s11042-020-10139-6.

Ingo Speier et al., Color temperature tunable white light LED system, Proceedings vol. 6337, Sixth International COnference on SOlid state Lighting, Sep. 12, 2006, San Diego, California, United States.

Zhan Xiaoqing et al: "A Neural-Network-Based Color Control Method for Multi-Color LED Systems", IEEE Transactions on Power Electronics, Institute of Electrical and Electronics Engineers, USA, vol. 34, No. 8, Aug. 1, 2019 (Aug. 1, 2019), pp. 7900-7913, XP011727062, ISSN: 0885-8993, DOI: 10.1109/TPEL.2018. 2880876 [retrieved on May 23, 2019].

* cited by examiner

LUMINAIRE WITH MULTICOLOR NEURAL NETWORK CONTROL

TECHNICAL FIELD

The subject matter of the present invention relates to the dynamic control of luminaires with multiple color channels, wherein a trained neural network controls the luminous or radiant flux emitted by each color of the luminaire in order to satisfy a set of physical constraints.

BACKGROUND

The term "light-emitting element" (LEE) is used to define any device that emits electromagnetic radiation within a wavelength regime of interest, for example, the visible, infrared or ultraviolet regime, when activated, by applying a potential difference across the device or passing a current through the device. Examples of light-emitting elements include solid-state, organic, polymer, phosphor coated or high-flux light-emitting diodes (LEDs) or other similar devices as would be readily understood by a person knowledgeable in the art. An LEE may have two or more constituent LEEs.

The introduction of high-power light-emitting diodes (LEDs) some twenty years ago led to the introduction of color-changing luminaires with red-, green-, and blue-emitting (RGB) LEEs (e.g., Speier and Salsbury 2006). By connecting the LEEs to three independent electronic drivers ("color channels") and varying the drive current to each color group, it is possible to generate a wide range of colors, including "white" light with different correlated color temperatures (CCTs).

Mixing red, green, and blue light will produce colored light with any chromaticity within the color gamut defined by the chromaticities of the red, green, and blue light sources. However, the lack of spectral radiant flux between approximately 550 nm and 600 nm, which we generally perceive as yellow light, results in yellow objects illuminated by RGB LEEs appearing to be dull and lifeless. In general, such RGB light sources have poor color rendering properties.

To resolve this issue, many color-changing luminaires designed for architectural applications include amber-emitting LEEs. These RGBA LEE luminaires require four independent color channels, but the improved color rendering capabilities often justifies their additional cost.

There is however a disadvantage. With three color channels, the chromaticity of the mixed light is uniquely defined by the ratios of red, green, and blue light. This is not true for four or more color channels. Taking an RGBA luminaire as an example, there are an infinite number of different ratios of red, green, blue, and amber light that will, when mixed, produce light with a specific chromaticity.

The disadvantage is that each different set of ratios results in different color rendering capabilities. Further, the different color LEEs will have different luminous efficacies, so that each different set of ratios will result in different luminous efficacies for the luminaire. With each LEE having a maximum allowable drive current, different ratios may result in different maximum luminous flux from the luminaire for the specific chromaticity.

This problem is compounded by the electrical, optical, and thermal characteristics of high-power light-emitting diodes. The luminous efficacy and spectral power distribution of an inorganic LEE depends on its junction temperature, forward voltage, dynamic resistance, and package thermal resistance.

The problem is further compounded by theatrical luminaires, which often have to swiftly and sometimes instantaneously change both the luminous flux and chromaticity of the emitted light. In doing so, the LEE junction temperatures will change, with consequent changes in luminous efficacies (particularly for amber LEEs) and spectral power distribution as the LEE heat sinks reach new (if temporary) thermal equilibria.

Unfortunately, there is no deterministic method to determine the optimal set of ratios for LEE-based luminaires with more than three color channels. Mathematically, it is an overdetermined system with four or more input variables (i.e., the luminaire's color channel settings) and only three output variables (i.e., the CIE tristimulus values X, Y and Z defining the luminaire's target chromaticity and luminous flux output). Given, for example, a seven-color theatrical luminaire, an operator can only guess at the drive current settings for seven independent color channels to achieve a desired chromaticity and luminous flux. Worse, the LEE electrical, optical, and thermal characteristics are nonlinear.

To understand the problem, first consider color-changing LEE modules with red, green, and blue (RGB) LEEs. Generating a specific color is a simple matter of choosing the appropriate ratios of the red, green, and blue LEE intensities. For example, if we want to generate 4150 K white light, we might choose the color channel intensity ratios graphically shown in FIG. 1.

There are however two problems with RGB LEE-based luminaires. First, their color gamuts are fairly limited. In particular, they are typically unable to produce saturated blue, violet, and cyan colors (e.g., see gamut 20 provided by LEEs 22, 24, 26 in FIG. 2).

Second, the lack of spectral radiant flux between approximately 550 nm and 600 nm, generally perceived as yellow light, results in yellow objects illuminated by RGB light sources appearing dull and lifeless in comparison to an equivalent broadband white light source, such as a quartz-halogen luminaire with a CCT of 3200 K and a polyester color filter to raise its color temperature to approximately 4150 K.

FIG. 3 shows the color gamut 30 of a six-color LEE-based luminaire with the following LEEs:

Blue (440 nm)
Cyan (495 nm)
Green (525 nm)
Amber (595 nm)
Red (630 nm)
White (3000 K)

Unlike an RGB light source, there are an infinite number of color channel intensity combinations that will generate (in this example) 4150 K white light. FIG. 4 graphically shows two examples that would normally have to be determined through laborious trial and error using a colorimeter. Expressed numerically, the relative LEE intensities are shown in TABLE 1.

TABLE 1

| LEE Color | Example 1 | Example 2 |
|-----------|-----------|-----------|
| Red | 1.00 | 1.00 |
| Amber | 1.00 | 0.18 |
| Green | 0.85 | 0.51 |
| Cyan | 0.18 | 0.00 |

TABLE 1-continued

| LEE Color | Example 1 | Example 2 |
|---|---|---|
| Blue | 0.20 | 0.10 |
| White | 1.00 | 1.00 |

The resultant white light generated by the two examples has the same chromaticity and so is visually indistinguishable. However, the luminous flux of the first example is 84 percent greater than that of the second example. Moreover, the CIE General Color Rendering Index Ra for the first example is 62, while that of the second example is 27.

The difference in luminous flux is easily explained—the human eye is more sensitive to amber light than it is to red light. Similarly, the greater amount of amber light in the first example results in much better color rendering properties.

Ashdown (2016) disclosed a method of modeling the spectral power distribution (SPD) and luminous flux of LEEs based on mathematical models involving maximum current, forward voltage, dynamic resistance, LEE package thermal resistance, and LEE substrate temperature to predict their SPDs and luminous fluxes. A view of a program for such modeling is shown in FIG. 5, in which a system parameter page for a luminaire is shown. The models may be relatively complex, as some of the parameters are nonlinear. For example, FIG. 6 shows the nonlinear dependency of luminous flux on the LEE junction temperature for typical single-color LEEs. As an example, a variant of the spectral power distribution prediction model of Fan et al. (2020) may be employed.

A genetic algorithm (e.g., Katoch et al. 2021) was then used to iteratively calculate a population of color channel intensity combinations and evaluate their luminous flux and chromaticities, following which the best candidates were selected as the basis of the next generation population. For example, the screenshot of a program shown in FIG. 7 displays the ten best candidate combinations. Each intensity combination for a luminaire with 'n' color channels represents a chromosome, with each intensity represented by a floating point or integer (e.g., 0 to 4095) value as a gene of the chromosome. The genetic algorithm operators of selection, crossover, and mutation are then applied to these genes.

Ashdown (2016) further proposed calculating the best solutions for hundreds of different target chromaticities, which are then stored in memory. When the user later specifies a desired color, the program finds the best solution for the nearest matching color, then uses this to "seed" the initial randomly selected population of intensity combinations for the genetic algorithm. The genetic algorithm can then converge more quickly to the best solution.

A disadvantage of this method is that the calculations needed to model the spectral power distributions of the LEEs and calculate the chromaticities and color rendering properties of the mixed light are computationally demanding and so ill-suited to real-time operation of an architectural or theatrical multicolor luminaire.

This background is not intended, nor should be construed, to constitute prior art against the present invention.

SUMMARY OF THE INVENTION

There is therefore a need for a system and method whereby the chromaticity and luminous flux output of a four or more color LEE-based luminaire can be dynamically controlled by an RGB controller with three color channels.

In doing so, the controller may control four or more color channel settings in order to produce the specified chromaticity and luminous flux output while maintaining maximal luminous efficacy and/or color rendering capabilities for the luminaire. From the operator's perspective, the luminaire may appear as an RGB light source with a linear response to each color channel signal.

A neural network is used to take as input the three parameters provided by an RGB controller. The neural network, which is trained, outputs the four or more parameters that are used to drive the independent color channels of the luminaire. The driving signals corresponding to the four or more output parameters result in the luminaire providing the chromaticity and luminous flux output as specified by the RGB controller. In addition, the spectral composition of the light output may be such that the color rendering capability is maximum for the specified chromaticity and luminous flux output. Alternately, the combination of the output parameters, which dictate the driving signals, may be such that the efficacy of the luminaire is maximized for the specific chromaticity and luminous flux output. Furthermore, both the color rendering capability and the efficacy may be optimized taking into account each other's value, for example by requiring a minimum threshold to be achieved for one of them.

Disclosed herein is an illumination system comprising: n light-emitting elements (LEEs) each having a different peak wavelength: a dimming control with m input channels, wherein n>m, each input channel provides a control output, and the m control outputs together represent a chromaticity and a luminous flux; and a neural network having n output channels that each correspond to a different one of the peak wavelengths, the neural network connected to the dimming control to receive the m control outputs and trained to provide a driver signal on each output channel such that the n driver signals together control the LEEs to provide said chromaticity and said luminous flux, and control the illumination system according to a constraint other than said chromaticity and said luminous flux. In some embodiments, m=3, wherein the m input channels are red, green and blue.

Also disclosed is a method for producing light comprising: receiving, by a neural network, m control outputs from a dimming control in an illumination system, the m control outputs together representing a chromaticity and a luminous flux; receiving, by the neural network, a constraint for the illumination system other than said chromaticity and said luminous flux; converting, by the neural network, the m control outputs to n driver signals, wherein n>m, each driver signal is for a different one of n light-emitting elements (LEEs) in the illumination system, each LEE having a different peak wavelength, and the n driver signals together satisfy said constraint; and sending the driver signals to drivers for the n LEEs, wherein, when the n LEEs are driven by the drivers, the n LEEs produce light with said chromaticity and said luminous flux, and the illumination system satisfies said constraint.

Further disclosed is a method for training a neural network comprising: (a) specifying, with m parameters, a target chromaticity and a target luminous flux for an illumination system; (b) using a genetic algorithm to determine multiple solutions for the target chromaticity and the target luminous flux, each solution comprising a set of at least n driver signals, wherein n>m and each driver signal is for a different one of at least n different peak wavelengths; (c) calculating, for each solution, values for one or more constraint parameters for the illumination system other than said target chromaticity and said target luminous flux; (d) selecting, from the multiple solutions, the solutions that are within a predetermined tolerance of the target chromaticity and the target luminous flux; (e) repeating (a) to (d) multiple times, each time for a different target chromaticity and a different target luminous flux; (f) using some of the selected solutions to train the neural network; and (g) using others of the selected solutions to validate the neural network.

In some embodiments the constraint is to maximize: (a) an efficacy of the illumination system; (b) a color rendering index of the light; (c) a melanopic flux to luminous flux ratio in the light; (d) a luminous flux to melanopic flux ratio in the light; (e) a ratio of a first wavelength flux to a second wavelength flux in the light; (f) any one of (a) to (e) while providing at least a threshold value of any other non-conflicting one of (a) to (e); (g) any one of (a) to (e) in priority to maximizing any other non-conflicting one of (a) to (e). In some embodiments the neural network converts the m control outputs to the n driver signals in real time.

BRIEF DESCRIPTION OF DRAWINGS

The following drawings illustrate embodiments of the invention and should not be
construed as restricting the scope of the invention in any way.

DETAILED DESCRIPTION

A. Glossary

CCT—Correlated color temperature

CIE—International Commission on Illumination

Figures 1, 2:
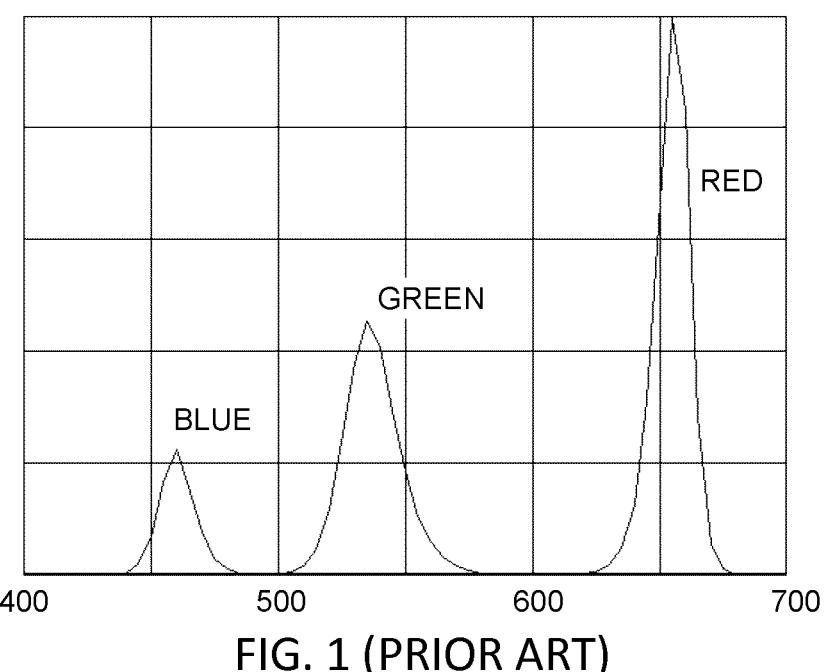
FIG. 1 shows the spectral power distribution of a 4150 K white light source generated using red-, green- and blue-emitting LEEs (prior art).
FIG. 2 shows the limited color gamut of a typical prior art RGB LEE-based luminaire.
Figure 3:
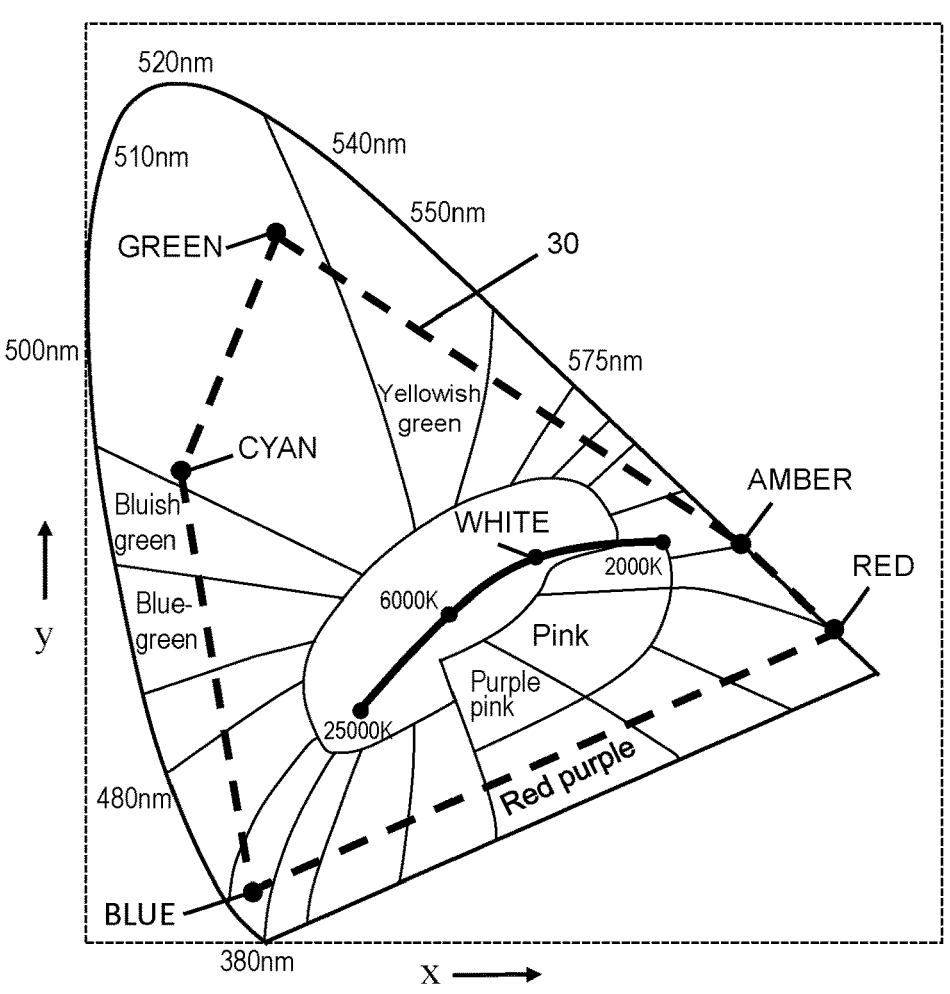
FIG. 3 shows the color gamut of a prior art six-color LEE-based luminaire.
Figure 4:
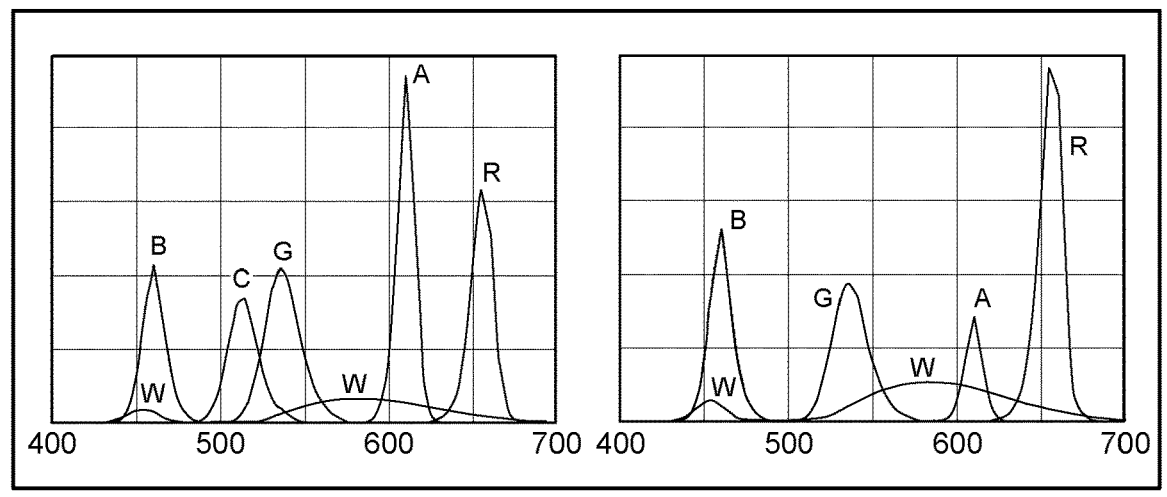
FIG. 4 shows the spectral power distributions for two example color intensity settings of a six-color LEE-based luminaire that generates 4150 K white light (prior art).
Figure 5:
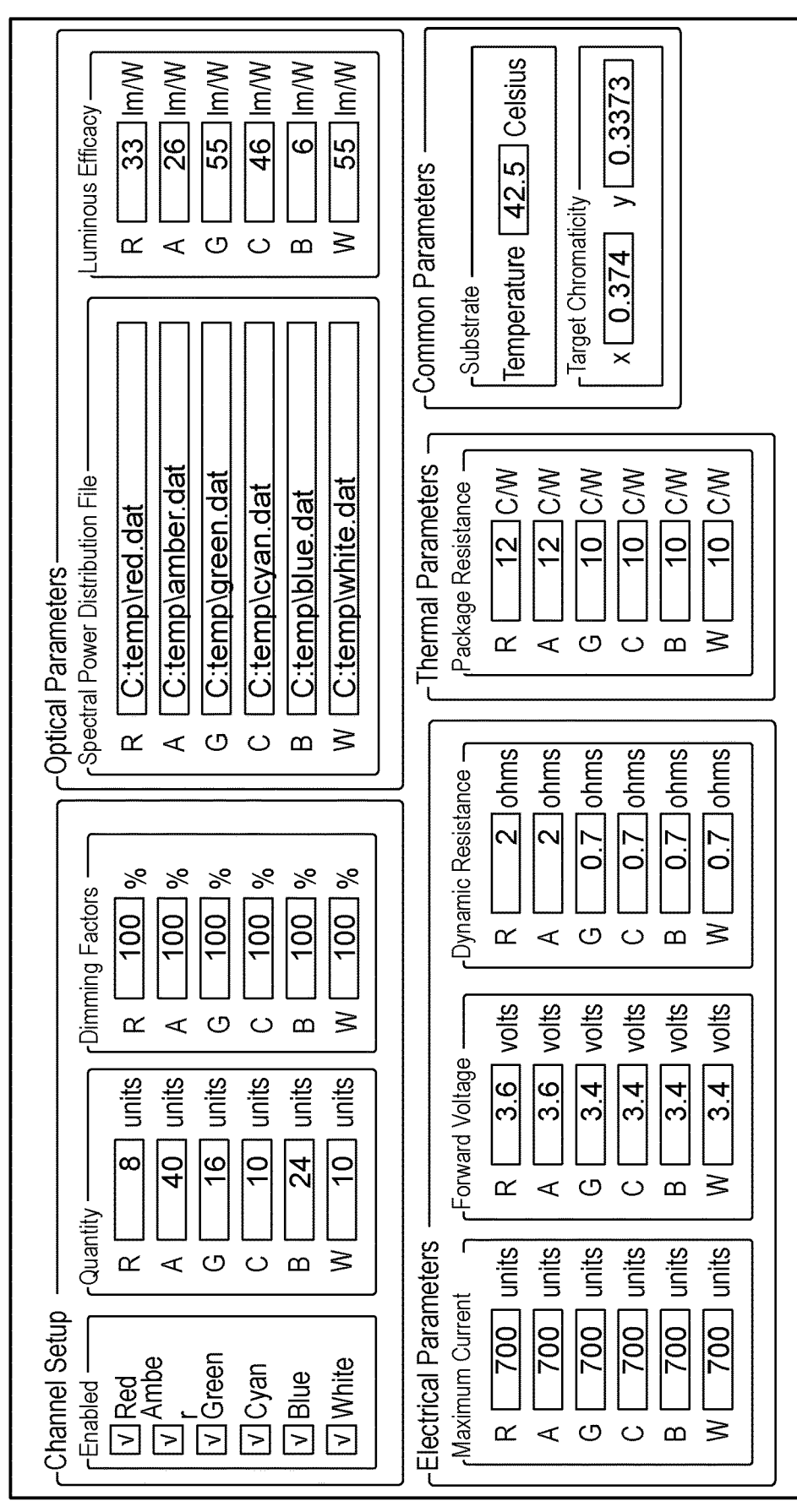
FIG. 5 shows the user interface of a program that models the optical performance of six LEEs with different colors (prior art).
Figure 6:
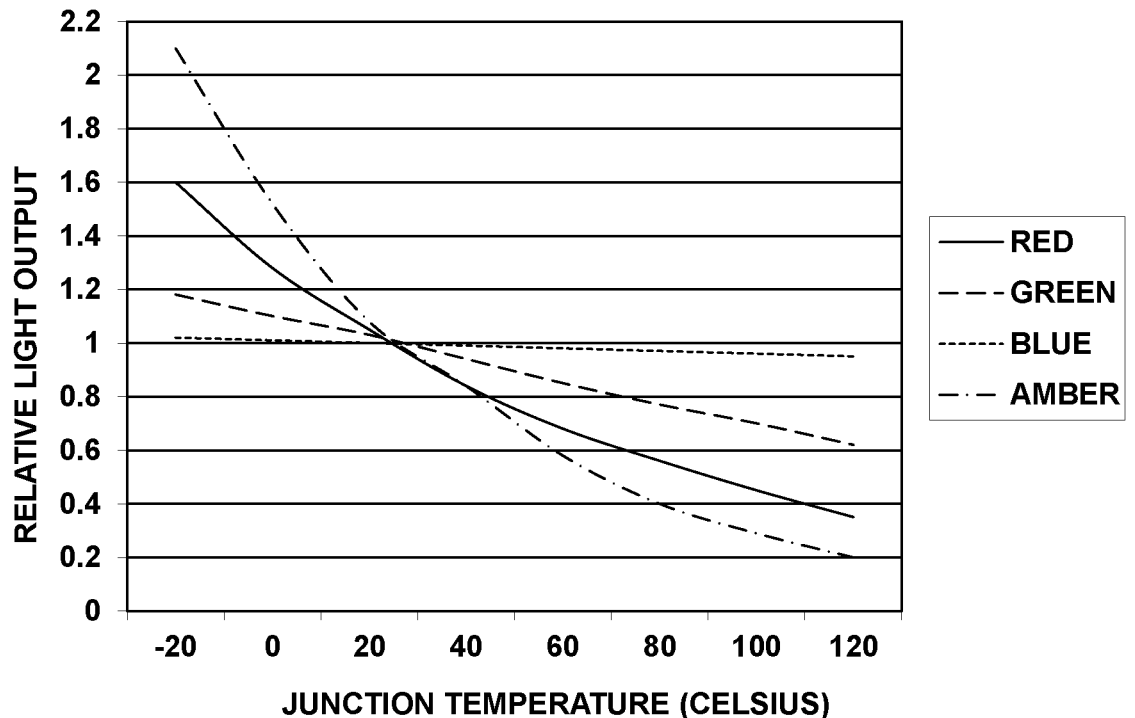
FIG. 6 shows the nonlinear dependency of luminous flux on the LEE junction temperature for typical single-color LEEs (prior art).
Figure 7:
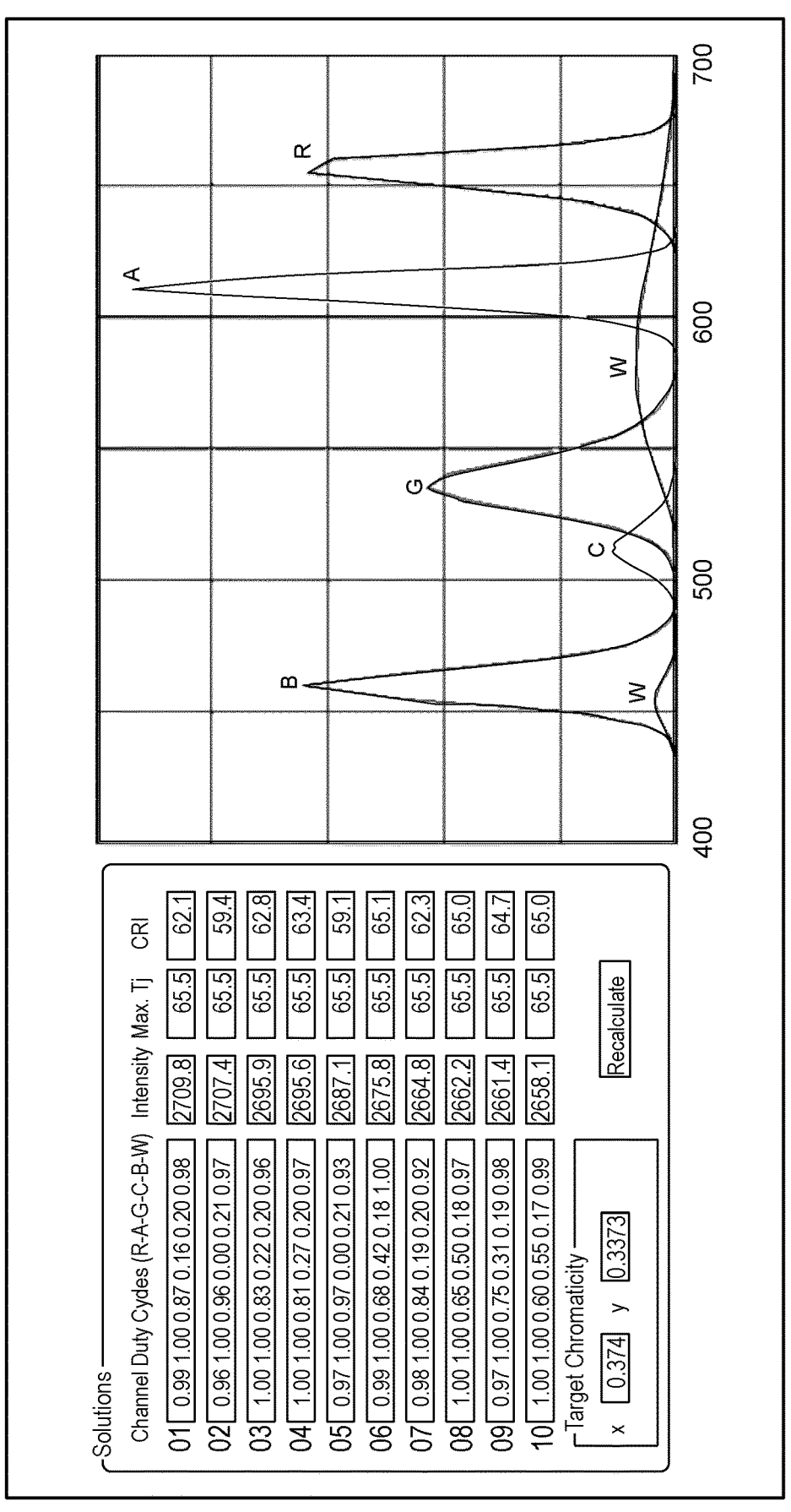
FIG. 7 shows the spectral power distribution of a six-color LEE-based luminaire that produces the maximum luminous flux for a target chromaticity of 4150 K (prior art).

Gamut—the range of colors that a given luminaire or set of LEEs can output

LED—Light-emitting diode

LEE—Light-emitting element

PPE—Photosynthetic photon efficacy

RBF—Radial basis function

The term "processor" or "processing circuitry" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "real time" means that as one action is occurring, another action is occurring in response to it and at the same time, subject to inherent time lags due to electronic and mechanical limitations. The actions may appear to a human to be simultaneous, or to be close enough together that their occurrences are, for substantially all intents and purposes, as good as simultaneous.

RGB—Red, green and blue

RGBA—Red, green, blue and amber

The term "software" includes, but is not limited to, program code that performs the computations necessary for, for example, receiving lighting control and sensor inputs, training a neural network, calculating outputs and controlling a luminaire.

SPD—Spectral power distribution

B. Exemplary Embodiments

In the present invention, the method of Ashdown (2016) is used to generate the best solutions for thousands of different target chromaticities and different operating conditions, particularly but not limited to, LEE substrate temperatures and heat sink thermal resistances. In the present invention, at least an order of magnitude more solutions are generated. However, rather than directly controlling the color channels of a multicolor luminaire, the solutions are used to train a neural network, such as the neural network disclosed in U.S. Pat. No. 7,687,753, Control System for an Illumination Device Incorporating Discrete Light Sources.

The set of best solutions for thousands of different target chromaticities and different operating conditions represents a nonlinear multidimensional function. Neural networks are known to be universal approximators capable of representing any continuously differentiable bounded function. As an example, a radial basis function (RBF) neural network may be used to represent the multidimensional function whose solution maintains maximum luminous efficacy (e.g., Montazer et al. 2018). It is not necessary or even desirable to have an analytic expression for the function. Instead, a neural network can be trained to learn the function with example input data and known or desired output data. The network can therefore be trained using a predetermined set of inputs and the desired responses.

Figure 8:
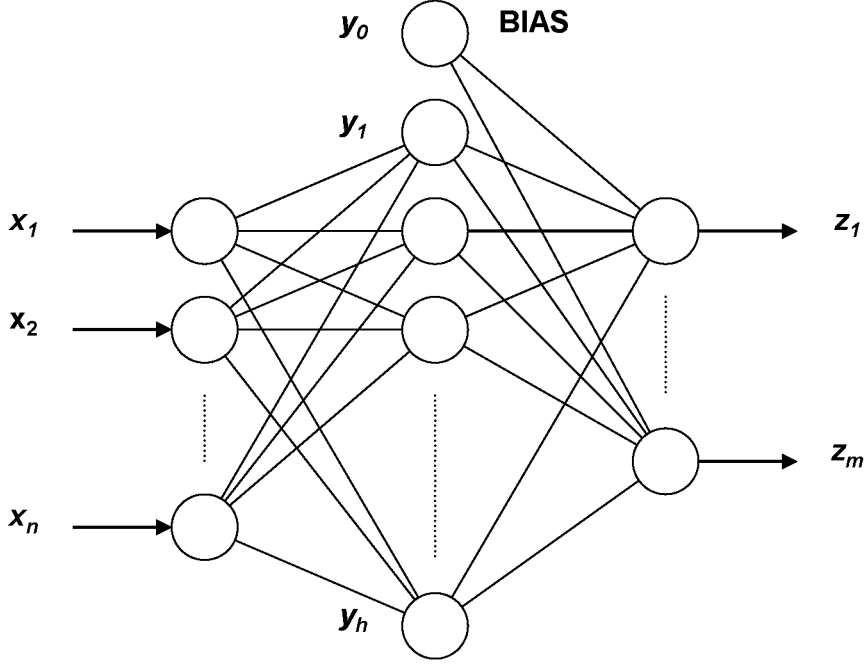
FIG. 8 shows the schematic of a radial basis function neural network (prior art).

As shown in FIG. 8, the RBF network is a feedforward architecture with an input layer, one hidden layer, and an output layer. The input layer has n neurons, corresponding to the n elements of the input vector x.

The hidden layer has h neurons and one bias neuron, with each input neuron fully connected to the h hidden layer neurons. Each hidden layer neuron (including the bias neuron) is connected to the m output neurons, and has the following activation function:

$$y_i = \begin{cases} \exp\left(-\dfrac{\|x - c_i\|}{2\sigma^2}\right) & i = 1, 2, \ldots, n \\ 1 & i = 0 \end{cases} \quad (1)$$

which, apart from the bias neuron, is an n-dimensional Gaussian function with center c and width $\sigma$. The expression $\|x{-}c\|$ represents the Euclidean distance from the input vector x to the hidden layer neuron center c in the multidimensional space $\Re^n$.

Each output layer neuron represents one of m possible outputs for the input vector. The output values of these neurons are given by:

$$z_j = \sum_{k=0}^{h} y_i w_{ij} \quad (2)$$
$$j = 1, 2, \ldots, m$$

where $w_{ij}$ is the weight between the $i^{th}$ hidden layer neuron and the $j^{th}$ output layer neuron.

In operation, an arbitrary input vector x is presented to the RBF network. Each hidden layer neuron computes its output, and the results are presented to the output layer. Each output layer neuron performs a linear weighted summation of the hidden layer neuron outputs. The input vector x is thereby nonlinearly mapped to the output vector z.

Training an RBF network consists of: (1) determining the centers and widths of the hidden layer neuron activation functions; and (2) determining the weights needed for the output layer neurons. There are numerous training strategies, such as for example the gradient descent method (Fernandez-Redondo et al. 2004). Most training strategies produce equivalent results; the difference is in the rate of convergence (e.g., Montazer et al. 2018).

Radial basis function neural networks have been presented as an example, but any neural network that accepts floating point or discretized integer inputs and generates floating point or discretized integer outputs may also be employed.

In addition to maximum luminous efficacy for a specified chromaticity, other criteria can be used to evaluate the intensity combinations generated by the genetic algorithm. The user might for example specify a minimum color rendering index Ra that the combinations must satisfy while maximizing the luminous efficacy.

Figure 9:
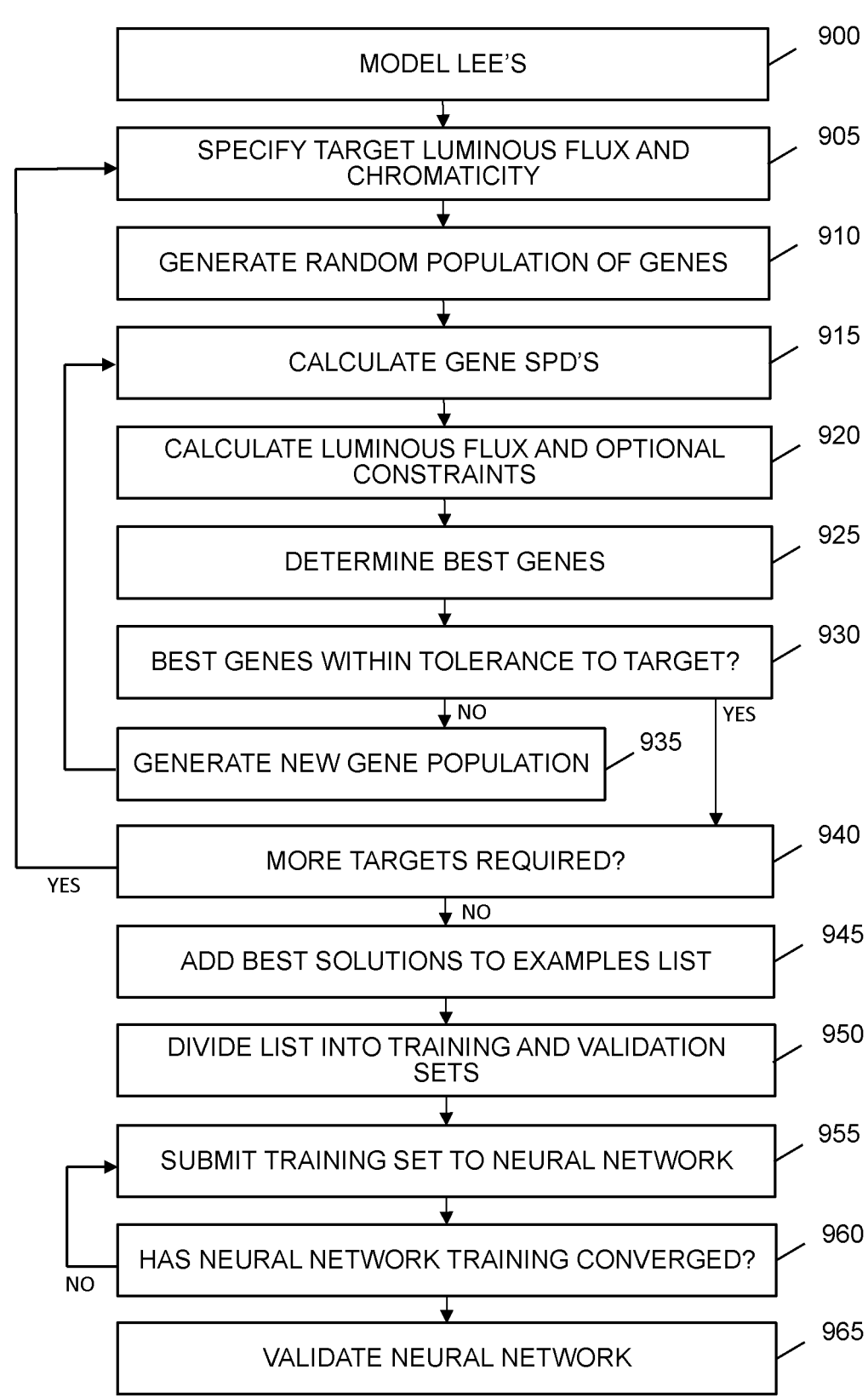
FIG. 9 shows a flowchart for the training of a radial basis function neural network controller for a multicolor LEE-based luminaire, according to an embodiment of the present invention.

FIG. 9 shows the process of training a radial basis function neural network for use as a multicolor LEE-based luminaire controller with n color channels. In Step 900, the n color LEEs are modeled. In Step 905, a target luminous flux and chromaticity for the mixed light generated by the luminaire is selected. The target luminous flux may be less than the maximum luminous flux that can be generated by the luminaire. A set of n LEE package temperatures may also be specified; alternatively, a single average LEE package temperature may be specified. The specified temperature(s) may have an effect on the contribution of intensity from each LEE to achieve the target luminous flux. Depending on the LEE models, other parameters may also be specified. Other constraints, such as minimum allowable color rendering index Ra of the light and/or minimum efficacy of the illumination system, may also be specified.

In Step 910, a random population of m genes with n floating point or integer chromosomes representing the color channel intensity settings is generated.

In Step 915, the absolute spectral power distribution for the luminaire (expressed in microwatts per nanometer) for each of the m genes is calculated using the color LEE models.

In Step 920, the m spectral power distributions are used to calculate the luminous flux and chromaticity of the luminaire and optionally other constraint parameters, such as the color rendering index Ra.

In Step 925, a subset p of the m genes whose luminous flux values are, subject to optional constraints, closest to the target luminous flux and chromaticity are determined and stored for later use.

In Step 930, if the luminous flux and chromaticity values of the p best genes are within a predetermined tolerance of the target luminous flux and chromaticity, they are retained as "best solutions" and control is passed to Step 940; otherwise, control passes to Step 935. If control passes to Step 935 then the corresponding subset p of the genes from Step 925 is used for generating the new gene population. Note that while the p best genes may be within the luminous flux and chromaticity tolerance, they may have significant differences with respect to other constraint values, such as Ra and efficacy. In some embodiments, if only some of the p best genes have luminous flux and chromaticity values within the predetermined tolerance, then these may be retained as "best solutions" while control passes to Step 935.

In Step 935, a new population of m genes is generated using the genetic algorithm selection, crossover, and mutation operators, following which control returns to Step 915. In Step 940, the number of target luminous flux and chromaticity solutions is tested. If it is less than a predetermined number q, control returns to Step 905; otherwise, control passes to Step 945.

In Step 945, every set of the best p genes (i.e. "best solutions") from the repetitions of Step 925 and their corresponding input values from Step 905 are saved to a list of r examples for the supervised training of a neural network.

In Step 950, the list of r examples is randomly divided into two sets—a first list of s examples for training the neural network and a second list of t examples for validating the trained neural network.

In Step 955, the s example color channel intensity values and their corresponding input values are submitted to the neural network, where the input values become the input values to the neural network and the corresponding color channel intensity values are compared against the n neural network output values to generate error signals.

In Step 960, the error signals are tested to determine whether the neural network training has converged. Convergence is achieved when each error signal is below a predetermined threshold. If the training of the neural network has not converged, control returns to Step 955: otherwise, control passes to Step 965.

In Step 965, the trained neural network is tested with the validation examples. If the network fails to predict the color channel intensity values for their corresponding input signals, the neural network has memorized the training samples rather than learned to generalize, and so the neural network architecture must be redesigned and the training process repeated.

Figure 10:
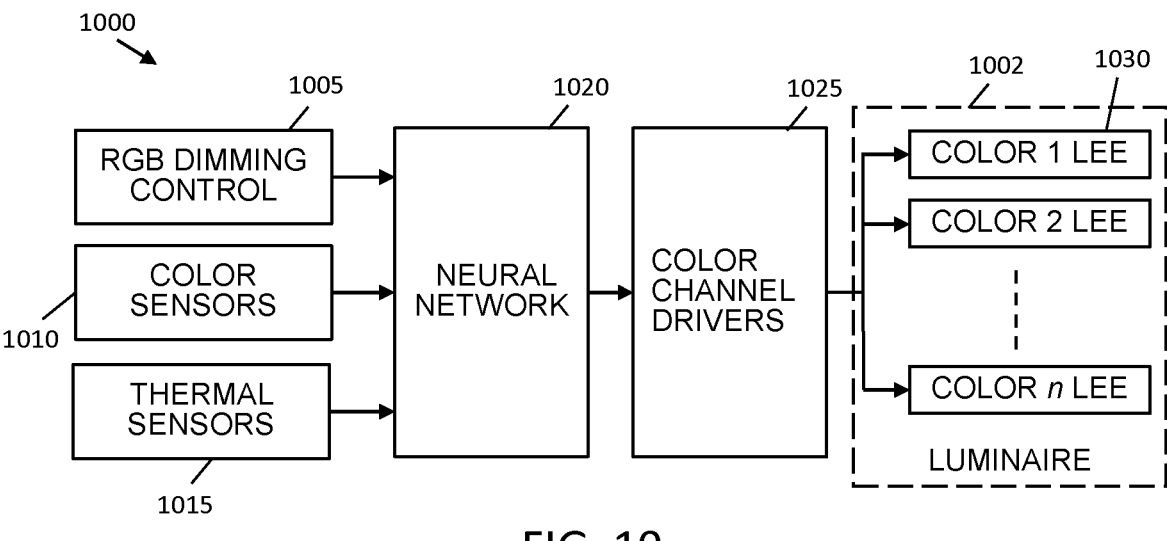
FIG. 10 shows the block diagram of a radial basis function neural network controller for a multicolor LEE-based luminaire, according to an embodiment of the present invention.

FIG. 10 shows an exemplary RBF neural network controller 1000 for a multicolor LEE-based luminaire 1002 with n color channels. An RGB dimming control 1005 outputting red, green and blue intensity values, optional color sensors 1010 monitoring the mixed light generated by the luminaire, and thermal sensors 1015 optionally monitoring the LEE package temperatures, average heat sink temperature, and ambient air temperature, are connected as inputs to neural network 1020. The dimming control therefore has three input channels, each channel providing a control output, the three control outputs together defining a chromaticity and a luminous flux. Each of the n output signals (i.e. driver signals) of neural network 1020 is connected to a different one of n color channel drivers 1025, each of which is in turn connected to a different one of n color LEEs 1030 in the luminaire 1002. Each of the n LEEs has a different peak wavelength, or SPD. Additional controls may be connected to the neural network, such as a controller for maximizing, minimizing or otherwise controlling the Ra or for maximizing, minimizing or otherwise controlling the efficacy of the luminaire. In some embodiments, the additional constraints may be predetermined, such as always maximizing the Ra, or running the luminaire with at least a minimum efficacy threshold. The n driver signals together control the LEEs to provide the chromaticity and the luminous flux defined by the RGB dimming control, and control the luminaire or illumination system according to a constraint other than the defined chromaticity and luminous flux.

Figure 11:
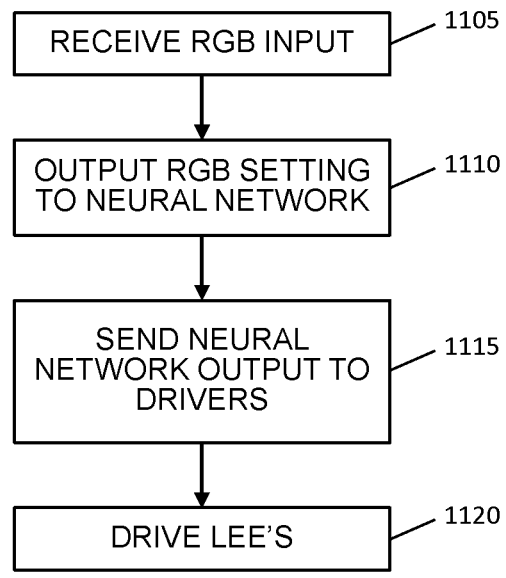
FIG. 11 is a flowchart for the operation of the controller in FIG. 10, according to an embodiment of the present invention.

Referring to FIG. 11, a flowchart of operation of the RBF network controller 1000 is shown. In step 1105, the RGB dimming control receives an input from a user or automated lighting control system. In step 1110, the RGB controller outputs the intended settings to the neural network 1020. The intended settings may be represented as, for example, a percentage output of each of the individual red, green and blue channels. The neural network 1020 then processes the intended settings that is has received and outputs, to the drivers 1025, the signals necessary for achieving a light output that has the same chromaticity as the intended RGB setting and that satisfies any constraints that are required, such as achieving at least a predetermined CRI threshold. In some embodiments, multiple constraints may be applied provided that they are non-conflicting with respect to each other. The drivers 1025 then output the necessary power for driving the n color LEEs 1030 of the luminaire 1002.

Figure 12:
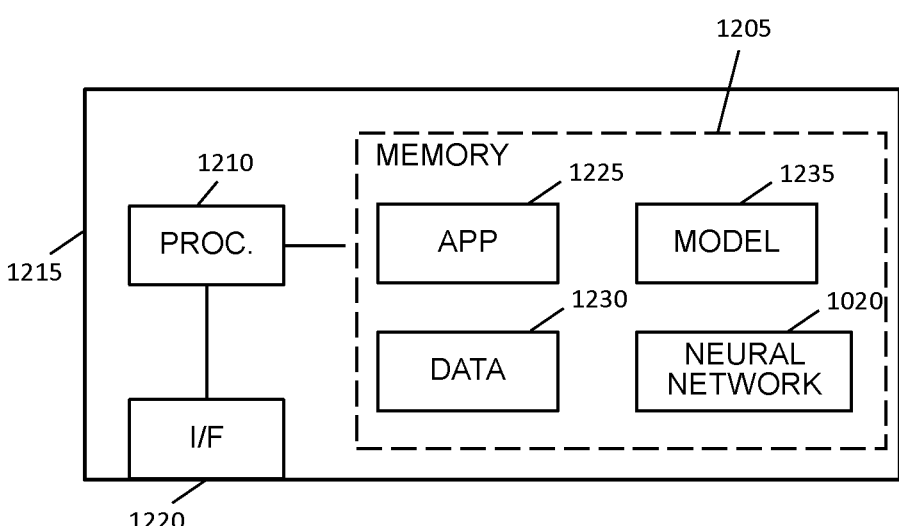
FIG. 12 is a block diagram of a device for training the neural network, according to an embodiment of the present invention.
Figure 13:
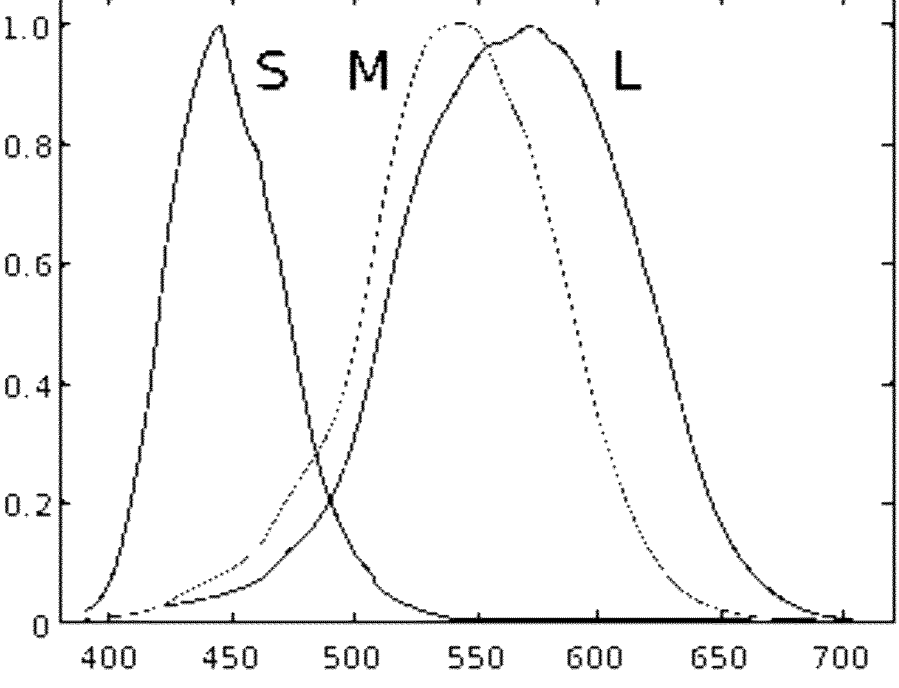
FIG. 13 shows the normalized spectral sensitivity of human retinal cones (prior art).

FIG. 12 shows a block diagram of a device or system that may be used for training the neural network 1020. The neural network may reside in a memory 1205 that is connected to processing circuitry 1210 in a computing device 1215, for example. One or more interfaces 1220, operably connected to the processing circuitry, allow for input and output to the device 1215. The interfaces may include a display screen, keyboard, connections to one or more light sensors, and light controllers, for example. An application 1225 may be stored in the memory and, when its computer-readable instructions are executed by the processing circuitry, it provides an interface to the neural network. Data 1230 may also be stored in the memory that defines the parameters of the LEEs, to which the neural network has access and can use. A model 1235 of the luminaire with its constituent LEEs may also be stored in the memory. The neural network may be trained inside the controller 1000, or outside of the controller and copied into it after training. Nominally identical luminaires may have LEEs with differences due to manufacturing tolerances, and, as a result, each luminaire may have a customized neural network controller.

C. Variations

As another example, the user might specify a maximum or minimum ratio of melanopic flux to luminous flux for circadian lighting applications.

Figures 14, 15:
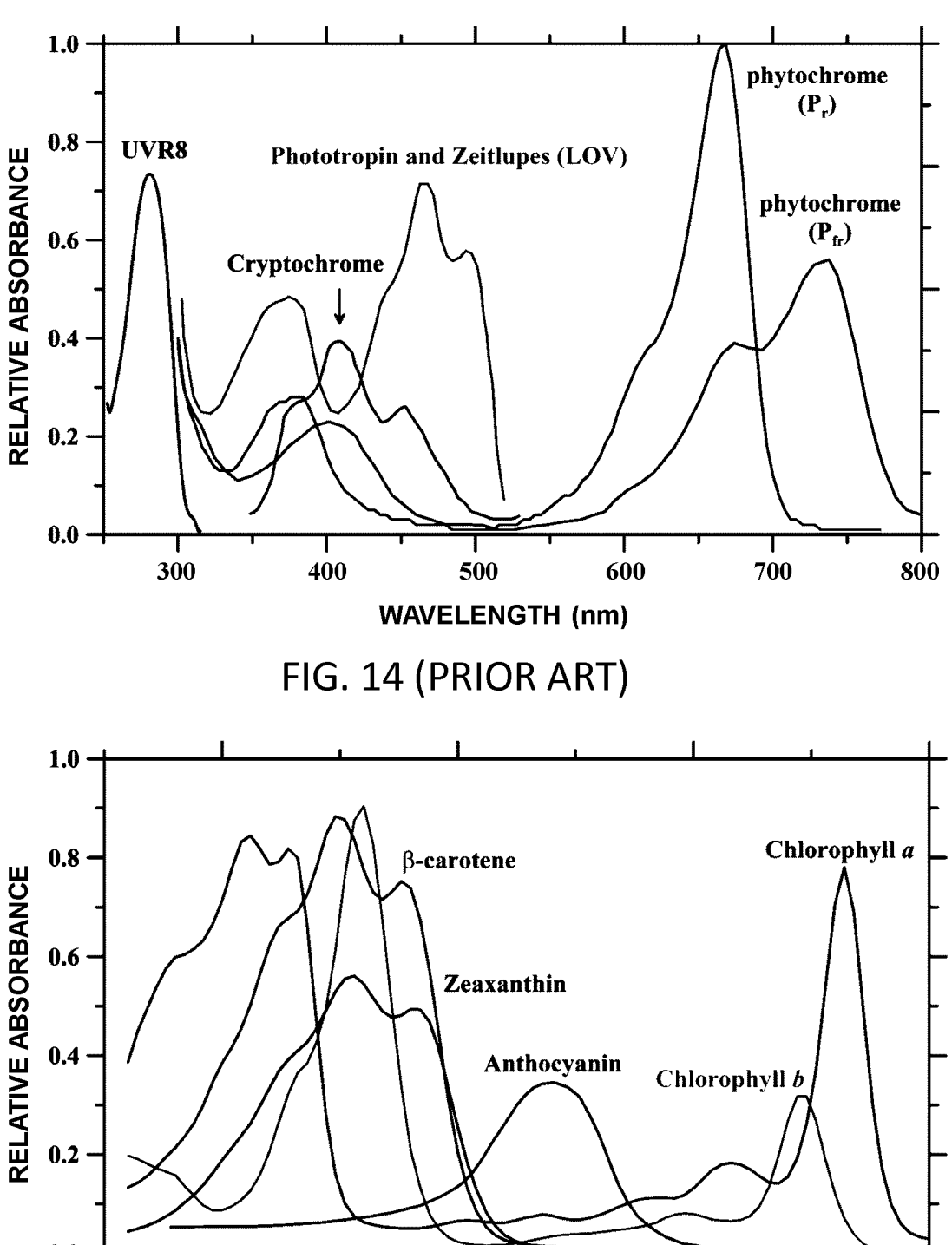
FIG. 14 shows the spectral absorptance distributions of cryptochrome, phototropin and phytochrome (prior art).
FIG. 15 shows the spectral absorptance distributions of anthocyanin, beta-carotene, chlorophyll A and B, and zeax-anthin (prior art).

As yet another example, a multicolor LEE-based luminaire might be used for horticultural applications, where there are complex and often competing responses of plants to the spectral power distribution of the incident photobiologically active optical radiation. The human eye has three color receptors designated S-cones, M-cones and L-cones (FIG. 11) with a spectral range of approximately 400 nm to 700 nm, but plants have numerous photoreceptors that are responsive to a spectral range of approximately 280 nm to 800 nm and possibly beyond (FIGS. 14 and 15). Irradiation of plants with UV-C is also beneficial to reduce pathogens. The range of wavelengths in a luminaire for horticultural lighting may therefore extend from 200 nm to 3000 nm.

LEE-based horticultural luminaires have traditionally employed blue (~450 nm) and red (~660 nm) LEEs to maximize photosynthesis through chlorophyll A/B and beta-carotene. However, it is now known that UV-A radiation, green light (~500 nm to ~600 nm), and far-red light (~725 nm) strongly influence seed germination, de-etiolation, plant growth, secondary metabolites production, flowering time, circadian rhythms, and acclimatization to UV-B radiation (e.g., Paik and Huq 2019).

Horticultural luminaires are now manufactured with six or more color channels. As the relationship between spectral power distribution and plant responses (which are often species-specific, and may vary on a circadian and circannual basis) become better understood through horticultural research, there will be a need to dynamically balance the spectral power distribution while maintaining maximum photosynthetic photon efficacy (PPE) for the luminaire. This will result in multiple constraints on the SPD that will vary depending on the desired outcomes for plant growth and other characteristics. For example, in a horticultural luminaire, the chromaticity of its output may be set to mimic the color of the sky as it changes throughout the day, while maximizing the PPE or controlling a ratio between two specific wavelengths in the SPD. Setting the chromaticity may serve as a visual indicator to a horticulturist, for example, of the stage in the lighting cycle for the plants.

While unconstrained RBFs are generally more accurate, they may use, for example, multidimensional Gaussian functions, or may have their parameters set to represent multidimensional trapezoidal functions. Other parameter settings for the RBF may represent sinusoidal functions and so forth, and many other possibilities are possible.

In general, a controller with any number of input channels may be used to control a luminaire with a greater number of output channels (i.e. independently controlled LEEs each having a different peak wavelength). For example, a two-channel input may be used to control the intensity and CCT of a white light luminaire that has 3, 4, 5 or more LEEs each with a different wavelength. In some embodiments, such a two-channel input may be preprocessed into the three corresponding RGB values so that the same neural network may be used. In some cases there may be embodiments with a single channel input, such as a white-light luminaire with a fixed output intensity. Again, such a one-channel input may be preprocessed into the three corresponding RGB values so that the same neural network may be used.

In other embodiments the input channels to the neural network may be the CIE tristimulus values.

In other embodiments, a series of two or more constraints on the light output by the luminaire, or on an operating parameter of the luminaire, may be maximized according to an order of priority.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense. In general, unless otherwise indicated, singular elements may be in the plural and vice versa with no loss of generality. Screen shots may show more or less than the examples given herein. All parameters, components, and configurations described herein are examples only and actual ones of such depend on the specific embodiment.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

The embodiments of the invention being thus described, it will be obvious that the same may be varied in many ways. Such variations are not to be regarded as a departure from the scope of the invention, and all such modifications as would be obvious to one skilled in the art are intended to be included within the scope of the following claims.

D. References

I. Ashdown (2016) "Controlling Multicolor LED Luminaires", All Things Lighting Association, blog post, February 2019

J. Fan, Y Li, I. Fryc, C. Qian, X. Fan, G. Zhang, "Machine-Learning Assisted Prediction of Spectral Power Distribution for Full-Spectrum White Light-Emitting Diode" IEEE Photonics Journal, Vol. 12, No. 1, February 2020

C. Hernandez-Espinosa, M. Fernandez-Redondo, J. Torres Sospedra, "Ensembles of RBFs Trained by Gradient Descent", Advances in Neural Networks—ISNN 2004. Lecture Notes in Computer Science, vol 3173. Springer, Berlin, Heidelberg S. Katoch, S. S. Chauhan, Vijay Kumar, "A Review on Genetic Algorithm: Past, Present and Future", Multimedia Tools and Applications (2021) 80:8091-8126

G. A. Montazer, D. Giveki, M. Karami, H. Rastegar, "Radial Basis Function Neural Networks: A Review", Computer Reviews Journal, Vol. 1, No. 1 (2018), pp 52-74

I. Paik and E. Huq, "Seminars in Cell & Developmental Biology", Science Direct Vol. 92, August 2019, pp 114-121

I. Speier and M. Salsbury, 2006, "Color Temperature Tunable White Light LED System", Proc. Vol. 6337, Sixth International Conference on Solid State Lighting, San Diego, USA

I claim:

1. An illumination system comprising:

n light-emitting elements (LEEs) each having a different peak wavelength;

a dimming control with 3 input channels, wherein:

n>3, where n is a whole number;

each input channel provides a control output; and the 3 control outputs together represent a chromaticity and a luminous flux; and a neural network having n output channels that each correspond to a different one of the peak wavelengths, the neural network connected to the dimming control to receive the 3 control outputs and trained to provide a driver signal on each output channel such that the n driver signals together:

control the LEEs to provide said chromaticity and said luminous flux while maximizing a color rendering index of light emitted by the LEEs.

2. The illumination system of claim 1, wherein the 3 input channels are:

red, green and blue; or

International Commission on Illumination (CIE) tristimulus values.

3. The illumination system of claim 1, wherein:

an efficacy of the illumination system;

a melanopic flux to luminous flux ratio in the light;

a luminous flux to melanopic flux ratio in the light; or a ratio of a first wavelength flux to a second wavelength flux in the light;

is maximized with lower priority than maximizing the color rendering index.

4. The illumination system of claim 1, wherein the neural network accepts the 3 control outputs as floating point or discretized integer inputs and generates the n driver signals as floating point or discretized integer outputs.

5. The illumination system of claim 4, wherein the neural network is a radial basis function neural network.

6. The illumination system of claim 1, wherein the neural network converts the 3 control outputs to the n driver signals in real time.

7. The illumination system of claim 1, wherein the peak wavelengths are between:

400 nm and 700 nm; or 200 nm and 3000 nm.

8. The illumination system of claim 1, further comprising one or more sensors connected to the neural network and positioned to monitor:

(a) the light;

(b) one or more package temperatures of the LEEs;

(c) one or more heat sink temperatures of the LEEs;

(d) ambient air temperature; or (e) any combination selected from (a) to (d);

wherein outputs from the one or more sensors are used by the neural network to convert the 3 control outputs to the n driver signals.

9. A method for producing light comprising:

receiving, by a neural network, 3 control outputs from a dimming control in an illumination system, the 3 control outputs together representing a chromaticity and a luminous flux;

receiving, by the neural network, a constraint to maximize a color rendering index of the illumination system;

converting, by the neural network, the 3 control outputs to n driver signals, wherein:

n>3, where n is a whole number;

each driver signal is for a different one of n light-emitting elements (LEEs) in the illumination system, each LEE having a different peak wavelength; and the n driver signals together correspond to said chromaticity and said luminous flux and satisfy said constraint; and sending the n driver signals to drivers for the n LEEs;

wherein, when the n LEEs are driven by the drivers:

the n LEEs produce the light with said chromaticity and said luminous flux while maximizing the color rendering index of the light.

10. The method of claim 9, wherein the neural network maximizes:

an efficacy of the illumination system;

a melanopic flux to luminous flux ratio in the light;

a luminous flux to melanopic flux ratio in the light; or a ratio of a first wavelength flux to a second wavelength flux in the light;

in lower priority to maximizing the color rendering index.

11. The method of claim 9, wherein said converting is in real-time.

12. The method of claim 9, further comprising:

monitoring, with one or more sensors:

(a) the light;

(b) one or more package temperatures of the LEEs;

(c) one or more heat sink temperatures of the LEEs;

(d) ambient air temperature; or (e) any combination selected from (a) to (d); and using, by the neural network, outputs from the one or more sensors to convert the 3 control outputs to the n driver signals.

13. A method for training a neural network comprising:

(a) specifying, with 3 parameters, a target chromaticity and a target luminous flux for an illumination system;

(b) using a genetic algorithm to determine multiple solutions for the target chromaticity and the target luminous flux, each solution comprising a set of at least n driver signals, wherein n>3, n is a whole number and each driver signal is for a different one of at least n different peak wavelengths;

(c) calculating, for each solution, a color rendering index value, used to maximize a color rendering index of the illumination system;

(d) selecting, from the multiple solutions, the solutions that are within a predetermined tolerance of the target chromaticity and the target luminous flux;

(e) repeating (a) to (d) multiple times, each time for a different target chromaticity and a different target luminous flux;

(f) using some of the selected solutions to train the neural network; and (g) using others of the selected solutions to validate the neural network.

* * * * *